Aug. 27, 1940.  G. W. REHFELD  2,212,650

SPLICE FOR RODS, CABLES, AND THE LIKE

Filed Nov. 7, 1938

INVENTOR
George W. Rehfeld.
BY
ATTORNEY

Patented Aug. 27, 1940

2,212,650

UNITED STATES PATENT OFFICE 2,212,650

SPLICE FOR RODS, CABLES, AND THE LIKE

George W. Rehfeld, Manhattan, Kans.

Application November 7, 1938, Serial No. 239,259

3 Claims. (Cl. 287—77)

This invention relates to a cable, wire, or rod splice, particularly a splice for connecting the sections employed in anchoring jetties and the like, and has for its principal objects to provide a splice of this character which is readily effected; to provide a splice which securely retains the connected members under twisting and pulling stresses to which they are subjected; to provide a splice which is simple and inexpensive to manufacture and formed in part by bending of the ends of the connected sections; to provide a splice that is not materially affected by corrosive action of the elements; and to provide a splice equipped with a double acting wedge whereby the grip acts in either direction with respect to the connected sections.

It is also an object of the invention to provide a splice connection having rounded working surfaces to avoid cutting of the connected members under the variable stresses imparted by the jetties.

It is a further object of the invention to provide standard sized splicing elements which are readily adaptable to cables, wires, rods, or the like, of several different diameters.

In accomplishing these and other objects of the invention, as hereinafter pointed out, I have provided improved details of structure, the preferred forms of which are illustrated in the accompanying drawing, wherein.

Figure 1:
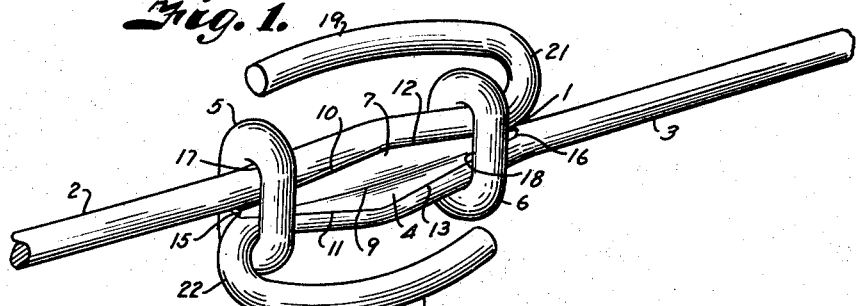
Fig. 1 is a perspective view of a splice embodying the features of the present invention and showing its application in connecting a pair of rod sections.
Figure 2:
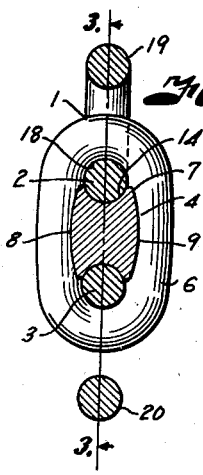
Fig. 2 is a cross-section on the line 2—2 of Fig. 3.

Referring more in detail to the drawing:

1 designates a splice embodying the features of the present invention whereby a pair of adjoining rod sections 2 and 3 are connected together in forming a continuous line such as used in anchoring jetties or the like to the bank of a stream, and which must withstand the vigorous movable forces imparted by the jetties.

Figure 5:
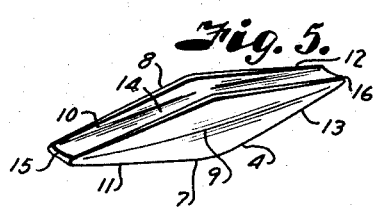
Fig. 5 is a detail perspective view of the wedge element.

The splice 1 includes a substantially diamond-shaped wedge element 4 and a pair of retaining links 5 and 6. The wedge element 4 is best illustrated in Fig. 5 and consists of a substantially diamond-shaped body 7 having rounded sides 8 and 9 and grooved edges 10—11 and 12—13 respectively converging toward the ends of the element, the grooves forming concave seats 14 to grip overlapped ends of the rod sections 2 and 3. The grooves terminate at the ends of the wedge in points 15 and 16 so as to bring the ends of the rod sections in as nearly axial alignment as possible. The central body portion of the wedge is of sufficient thickness to effect deformation of the overlapped ends of the rods in conformity with the shape of the wedge to secure the desired grip thereof, as later described.

The links 5 and 6 comprise elongated rings having openings 17 and 18 of suitable width to pass the ends of the wedge element and of length to accommodate the ends 19 and 20 of the rods 2 and 3. The links are preferably of round or circular cross-section as shown so as to avoid cutting of the rods when driving or drawing up of the links, as later described.

Figure 3:
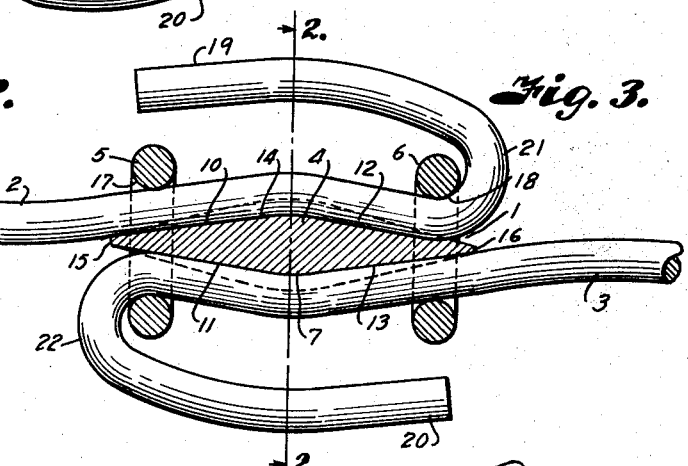
Fig. 3 is a longitudinal section on the line 3—3 of Fig. 2.
Figure 4:
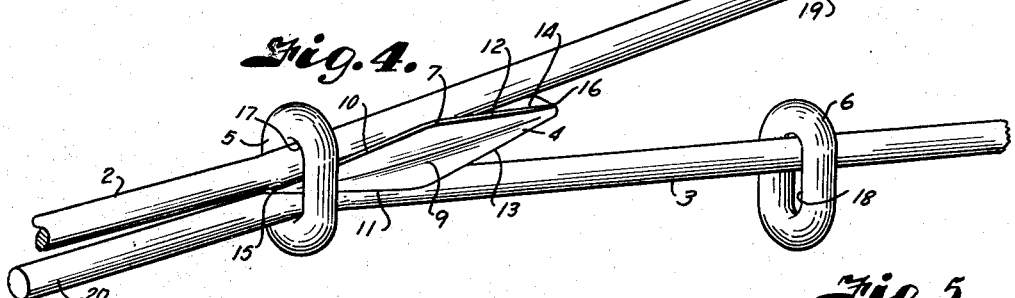
Fig. 4 is a detail perspective view showing application of the wedge element between the overlapped ends of the rods to be connected.

In effecting a splice of the character described, one of the links, for example 5, is sleeved over the rod section 2 and the other link over the other rod section. The end 20 of the rod section 3 is then extended through the link 5, below the rod section 2. The wedge element 4 is then inserted between the free end 19 of the rod section 2 and the rod section 3 so that the point 15 thereof extends through the opening in the link 5. To enhance the spreading action of the rods and assure seating engagement thereof along the entire length of the grooved sides 10 and 11, the opposite end of the wedge element may be tapped with a hammer or the like. The end 19 of the rod section 2 is then drawn toward the rod section 3 so that the end 19 may be passed through the opening in the link 6. The link 6 is then driven up over the end 16 of the wedge element to draw the rods into the grooves 12 and 13. The ends of the rods which project through the links are then respectively engaged by a suitable tool and bent retractively over the links, as shown at 21 and 22, Figs. 1 and 3.

Bending of the ends of the rods further enhances draw up of the links to effect firm grip of the rods with the seating grooves of the wedge element and to retain the links in functional position under pulling stresses applied to the respective sections.

Figure 6:
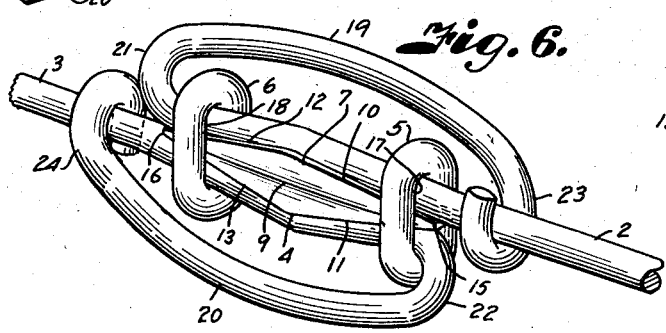
Fig. 6 is a perspective view of a slightly modified form of rod splice.

If desired, the rods may be overlapped a greater distance so as to provide sufficient projection of the retractively bent ends to permit formation of hooks 23 and 24 thereon which are hooked over the body of the rod sections, as shown in Fig. 6, thereby preventing straightening out of the bent ends under excessively high stresses.

While I have particularly described my invention in connecting a pair of rod sections, it is obvious that it may be used in connecting cables, rods, wires, or similar members without departing from the spirit of the invention.

From the foregoing it is obvious that I have provided a splice for connecting elongated sections which is readily applied, and which is effective in operation in that the wedging action is enhanced with increase in the stresses applied to the connected members.

What I claim and desire to secure by Letters Patent is:

1. A splice for connecting a pair of members having overlapping ends, a wedge between said overlapped ends, and means sleeved over said ends for retaining the wedge.

2. A splice for connecting a pair of members having overlapping ends, a diamond-shaped wedge between said overlapped ends, and links sleeved over said ends for drawing said overlapped ends in wedging contact with the wedge.

3. A splice for connecting overlapped portions of a pair of members, a wedge between said overlapped portions, links sleeved over said portions for drawing said members into contact with the wedge, and means on said members to prevent retractive movement of said links.

GEORGE W. REHFELD.